April 14, 1964  H. BERTRAND  3,128,496
APPARATUS FOR OPENING THE SHELLS
OF OYSTERS AND LIKE BIVALVES
Filed July 6, 1961
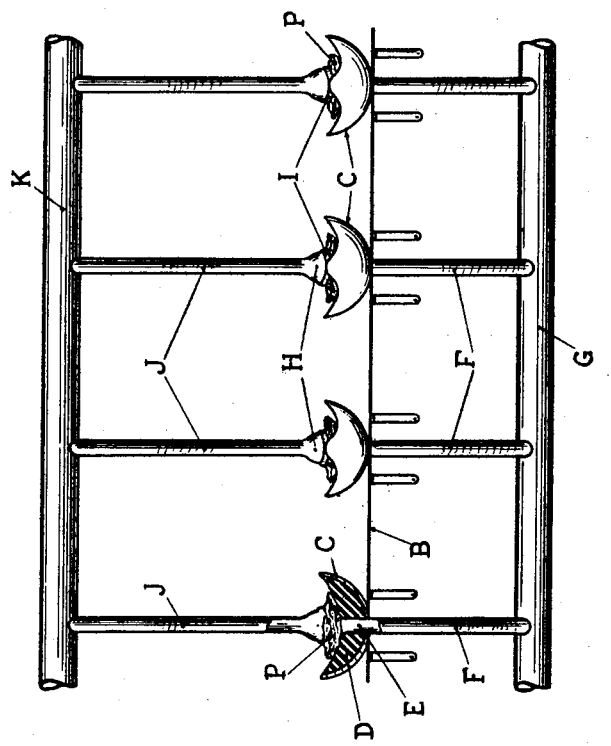
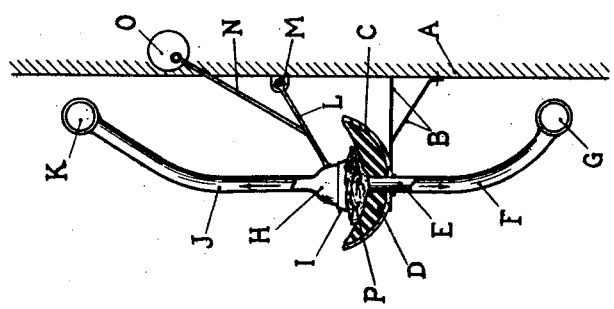
INVENTOR
HENRI BERTRAND United States Patent Office 3,128,496
Patented Apr. 14, 1964

3,128,496
APPARATUS FOR OPENING THE SHELLS OF
OYSTERS AND LIKE BIVALVES
Henri Bertrand, 20 Rue d'Alsace-Lorraine,
Orleans, France
Filed July 6, 1961, Ser. No. 122,349
4 Claims. (Cl. 17—9)

This invention relates to an apparatus for opening the shell of oysters and other like bivalves, and more particularly to apparatus for simultaneously opening a large number of oyster shells.

Oysters when taken from the sea are enclosed in a shell which consists of two valves. One of the valves is approximately cup shaped and contains the body of the animal. The other half or valve of the shell is approximately flat, and constitutes a cover for the cup-shaped valve. The two valves are linked by a hinge-like connection which is actuated by an adductor muscle. Actually the muscle, which closes the shell by drawing the two valves together and holds them in the closed position, consists of two approximately concentric elements which respectively perform the functions of closing and holding.

The conventional methods of opening oyster shells to give access to the edible parts of the animal fall into two broad groups. One group consists of mechanical methods, and the other one of methods based on the use of heat conveyed by steam, hot water, or the like.

The mechanical methods are based on forcing the two halves of the shell apart by stresses sufficient to overcome the retaining force of the closing muscle of the oyster. They require individual application of tools to each oyster in critically selected locations, and involve a relatively large amount of manual labor. They contribute appreciably to the cost of oysters, particularly where oysters have to be opened on an industrial scale as in canning plants.

The known devices which rely on the opening of the shell after heat is applied to the oyster and the animal is killed, permit a large number of oysters to be opened simultaneously with a minimum of effort. The killing of the animal by heat, in whichever manner the heat is applied, significantly affects the taste of the oyster meat and reduces its nutrient value. Some of the less stable proteins and vitamins which constitute important factors of the nutrient value of oysters are at least partly destroyed by heat and become unavailable as well as some trace elements found in the live animal only.

The principal object of this invention is the provision of an apparatus for opening oysters on a large scale without loss of heat-sensitive unstable components in the meat of the animal.

Other objects and many of the attendant advantages of this invention will become apparent as the disclosure proceeds.

I have found that cyclic or reiterated stresses applied to the closing muscle of an oyster rapidly lead to fatigue of the muscle which then relaxes spontaneously so that the next applied stress opens the shell. The muscle can be conveniently fatigued by pulling the two valves of the shell apart by cyclically timed stresses having a force insufficient to overcome the initial force of the closing muscle, which is very great indeed, considering its size.

The exact nature of this invention as well as other objects and advantages thereof will be readily apparent from consideration of the following specification relating to the annexed drawing in which:

FIG. 1 is a fragmentary side elevational, partly sectional view of preferred apparatus for carrying out the method of the invention; and FIG. 2 shows the apparatus of FIG. 1 in front elevation and partly in section.

The apparatus is mounted on a bracket B between standards A of which only one is visible in FIG. 1. A cup C of stainless steel or other material which resists corrosion by sea water is fixedly mounted on the bracket B. A cushion D of fairly firm rubber or other elastomeric material is fastened in the cup C. An axial passage E provided in the cushion D and the cup C communicates with a suction manifold G by means of a tube F. The suction manifold G in turn is connected to the usual vacuum pump (not shown) by means of conduits and control valves entirely conventional in themselves and not further illustrated.

A suction cup H of smaller diameter than the cup C and made of similar material is arranged approximately coaxial with the cup C in the operative position of the apparatus illustrated in both figures of the drawing. Its free edge is provided with a lip I of resilient rubber or the like. The outlet of the suction cup H is attached to one end of a length of flexible tubing J, the other end of which communicates with a suction manifold K connected to the same pump (not shown) as the manifold G by means of conduits and valves (not shown).

The suction cup H is mounted on one end of an arm L, the other end of which is fastened to a pivot M on the standard A. Reciprocating pivotal movement of the arm L on the pivot M causes the suction cup H to move toward and away from the cup C. This reciprocating movement is actuated by a drive arrangement which includes a disc O rotatable on a non-illustrated shaft which in turn is driven by an electric motor or other prime mover, not in itself relevant to the invention and not illustrated. A connecting rod N is eccentrically pivoted to the disc O and hingedly attached to a portion of the arm L spaced from the pivot M, whereby rotation of the disc O causes synchronized reciprocating movement of the cup H.

To operate the device of FIG. 1, the disc O is rotated 180° from the position shown in FIG. 1, whereby the cup H is raised from the cup C and an oyster P may be placed on the cushion D, preferably in such a manner that the flat valve faces upward. The relatively deep cushion D in the cup C is capable of conforming to the cupshaped contour of the other valve when light pressure is applied.

Such pressure is produced by turning the disc O again through 180° into the position seen in FIG. 1 in which the two valves of the oyster P are in sealing contact with the cushion D and the resilient lip I of the two cups C and H respectively. Vacuum is now applied to the two manifolds G and K by starting the pump or by appropriate valve adjustment, and the two suction cups attach themselves firmly to the valves of the oyster.

The drive actuating rotation of the disc O is now started, and the suction cup H is alternatingly moved toward and away from the cup C over a distance determined by the dimensions and the arrangement of the motion transmitting members L, M, N, and O. This distance is selected in such a manner that the resilience of the cushion D and of the lip I will absorb the relative movement of the two cups C, H without loss of sealing contact between the cups and the oyster P even when the shell of the latter remains closed.

The two valves are thus cyclically pulled away from each other and released at a frequency which depends on the rotary speed of the disc O. The speed of rotation of the disc O and the stroke of the cup H have to be adjusted according to the size and type of bivalves the shells of which have to be opened.

In a typical case, fatigue of the closing muscle sets in within approximately a minute when stresses are applied at the rate of approximately 250 cycles per minute, but it will be understood that the method is not limited to any specific rotary speed nor to any specific number of applied stresses, but that the stresses must be quite numerous, and that they should be applied in fairly rapid sequence.

The fatigue of the closing muscle of an oyster sets in quite suddenly. Generally, there is no gradual opening of the shell, but one applied stress suddenly opens the shell wide, and the live animal is available unprotected for further processing.

As seen from FIG. 2, a plurality of work stations, each identical with that shown in FIG. 1 are mounted on a common bracket B side by side, and are supplied with vacuum from the common manifolds G and K. The drive arrangement shown in FIG. 1 is expanded or multiplied in an obvious manner to actuate the several cups H of the multi-station apparatus of which only four stations are visible in FIG. 2. Each station may be equipped with its own pivot M, arm L, connecting rod N, and disc O, but the several discs O are preferably mounted on a common shaft for synchronous operation in which all stations are in the same operative position at the same time, as is evident from FIG. 2.

The operation of the multi-station apparatus follows from the description of the operation of a single station given hereinbefore. All stations are charged with closed oysters P at the same time. While not all oysters will open up under the applied stresses at the same time, oysters of the same species and approximate size will open after periods sufficiently similar to permit simultaneous opening of a large number of oysters with a minimum loss of machine time.

When all oysters are open, the machine is stopped in a position of the discs O 180° from that shown in FIG. 1 for removal of the oysters from their shells. The vacuum may then be broken and the empty shells discarded. It is also possible to remove the entire oysters with their valves spread open and to process them further away from the machine, since the closing muscles will not rapidly recover and may be severed before they are again in a position to close the two valves of the shell. When operating in the last-mentioned fashion, particularly effective use is made of the apparatus, and a large number of oysters may be opened in a given time.

It is obvious that the mechanical method employed does not alter the chemical constitution of the oyster meat, and that it does not require labor of an order greater than the conventional heating methods.

The method is applicable to other bivalves as well, and the apparatus illustrated can readily be dimensioned or otherwise adapted to accommodate them.

It should be understood, of course that the foregoing disclosure relates to only a preferred embodiment of the invention, and that it is intended to cover all changes and modifications of the example of the invention herein chosen for the purpose of the disclosure which do not constitute departures from the spirit and scope of the invention set forth in the appended claims.

What I claim is:
1. In a device for opening the shell of an oyster or like bivalve, in combination, a first and a second shell opening member; attaching means for releasably attaching said members respectively to the two valves of a bivalve shell, said attaching means including first and second suction cup means on said first and second shell opening members respectively, and a source of vacuum communicating with said suction cup means for attaching said first and second shell opening members to respective valves of said shell when said cup means are in contact with respective valves; and means applying repeated stresses to said shell opening members in a direction away from each other while said members are attached to said valves, the latter means including rotary drive means, and motion transmitting means interposed between said drive means and one of said shell opening members for actuating reciprocating movement of said one shell opening member toward and away from the other shell opening member when said drive means rotates.

2. In a device for opening the shell of an oyster and like bivalves, in combination, a support; two shell opening members mounted on said support, one of said members being movable toward and away from the other member; resilient means fastened on each of said members defining a suction cup opposite the suction cup of the other member; a source of vacuum communicating with said suction cups for retaining a bivalve shell between said members by the suction applied to said cups when said cups respectively are in contact with the valves of said shell; and drive means on said support for actuating reciprocating movement of said one shell opening member relative to said other shell opening member over a predetermined distance, said resilient means being of a resilience sufficient to permit movement of said one member over said predetermined distance while said suction cups are in respective contact with said valves.

3. In a device for opening the shell of an oyster and like bivalves, a first and second shell opening member; a first and second suction cup means on said first and second shell opening member respectively; a source of vacuum communicating with said suction cup means for releasably attaching the first and second shell opening members to respective ones of the shell valves when said suction cup means are in contact with the valves; and means applying repeated stresses to said shell opening members in a direction away from each other while said suction cup means are attached to said valves.

4. In a device for opening the shell of an oyster and like bivalves, a first and a second shell opening member; attaching means for releasably attaching said members respectively to the two valves of a bivalve shell; and means applying repeated stresses to said shell opening members in a direction away from each other while said members are attached to said valve, said latter means including rotary drive means and motion transmitting means interposed between said drive means and one of said shell opening members for actuating reciprocating movement of said one shell opening member relative to the other member when said drive means rotates.

References Cited in the file of this patent
UNITED STATES PATENTS

| | | |
|---|---|---|
| 1,953,436 | Saunders | Apr. 3, 1934 |
| 2,473,609 | Plock | June 21, 1949 |
| 2,691,794 | Gonyea | Oct. 19, 1954 |
| 2,703,124 | Buck | Mar. 1, 1955 |
| 2,823,414 | Seal et al. | Feb. 18, 1958 |
| 2,832,989 | Harris | May 6, 1958 |
| 2,942,292 | Rey | June 28, 1960 |